United States Patent [19]

Daughton et al.

[11] 3,753,235

[45] Aug. 14, 1973

[54] MONOLITHIC MEMORY MODULE REDUNDANCY SCHEME USING PREWIRED SUBSTRATES

[75] Inventors: James M. Daughton, Essex Junction; James J. Tomczak, Burlington; Francis W. Wiedman, III, Essex Center, all of Vt.

[73] Assignee: International Business Machines Corporation, Armonk, N.Y.

[22] Filed: Aug. 18, 1971

[21] Appl. No.: 172,838

[52] U.S. Cl. .......................... 340/172.5, 340/173 SP

[51] Int. Cl. .......................... G06f 13/00

[58] Field of Search .................. 340/172.5, 173 SP, 340/174 ED; 307/303, 215, 218

[56] References Cited

UNITED STATES PATENTS

| | | | |
|---|---|---|---|
| 3,422,402 | 1/1969 | Sakalay | 340/172.5 |
| 3,588,830 | 6/1971 | Duda et al. | 340/172.5 |
| 3,222,653 | 12/1965 | Rice | 340/172.5 |
| 3,245,051 | 4/1966 | Robb | 340/173 SP |
| 3,434,116 | 3/1969 | Anacker | 340/172.5 |
| 3,654,610 | 4/1972 | Sander et al. | 340/172.5 |
| 3,234,521 | 2/1966 | Weisbecker | 340/172.5 |
| 2,995,666 | 8/1961 | Wood | 307/216 |
| 3,633,175 | 1/1972 | Harper | 340/172.5 |

OTHER PUBLICATIONS

Dewitt et al., Memory Array, June 1967, Page 95, Vol. 10, No. 1, IBM Technical Disclosure Bulletin.

*Primary Examiner*—Harvey E. Springborn
*Attorney*—Francis J. Thornton et al.

[57] ABSTRACT

A monolithic memory module for memory systems capable of utilizing both good chips and partially defective chips. Each chip is provided with an extra bit line of storage cells that can be substituted for failing cells and a comparator circuit having pads that can be contacted externally by pre-wired substrates.

The pre-wired substrates are designed in different combinations to contact selected numbers of the pads and thus act as constant output read only memories to the chips mounted thereon. That is, each substrate contains connecting wiring for selectively contacting the pads of the comparator circuit either to identify the defective line and substitute for it the redundant line or to disable the redundant line when its use is unnecessary.

4 Claims, 3 Drawing Figures

INVENTORS
JAMES W. DAUGHTON
JAMES J. TOMCZAK
FRANCIS W. WIEDMAN

BY Francis J. Thornton
ATTORNEY

MONOLITHIC MEMORY MODULE REDUNDANCY SCHEME USING PREWIRED SUBSTRATES

RELATED APPLICATION

An application Ser. No. 172,800 filed on even date herewith by J. W. Sumilas and N. G. Vogl, Jr., entitled "Yield Enhancement Redundancy Technique" and assigned to the same assignee of the present invention teaches that redundancy may be provided on a semiconductor memory chip by adding to the chip a redundant line of storage cells, a comparator and a read only memory.

BACKGROUND OF THE INVENTION

1. Field of the Invention

This invention relates to a memory module for use in a memory system and more particularly into a memory module that can utilize both totally good cells and cells with defective bits therein.

2. Description of the Prior Art.

Monolithic integrated semiconductor structures having a plurality of functionally isolated individual cells that are electrically connected to provide a memory array have been described in U.S. Pat. No. 3,508,209 to B. Agusta et al., issued Apr. 21, 1970 and assigned to the same assignee as the present invention.

U.S. Pat. No. 3,222,653 shows means for storing the address of an auxiliary memory location within a section of the defective memory location itself if there is room for such storage in the defective memory location. The defective memory location is tagged and, when the latter is read out, the computer which employs such a defective memory location can immediately go to the address, stored in the memory, to fetch a corrected word from an auxiliary memory. The patent further teaches means for storing both the address of a defective memory location and the address of an auxiliary memory location storing the corrected word in a matching register; such that, during subsequent readout of the defective memory location, the contact of such matching register was compared with a standard register in order to find a location in the auxiliary memory that contained a word substitutable for the defective word in the memory.

U.S. Pat. No. 3,434,116 teaches dividing each word line of a bulk memory into a large number of subword cells for replacement purposes and employing a small read only memory for registering the location of the defective subword cell groups in the bulk memory, as well as for registering the location of alternative subword cell groups in a replacement memory, whereby it is possible to compensate for all of the bad bits that are expected to occur in the bulk memory by providing a replacement memory which has a bit storage capacity equal to the expected number of bad bits. When a word line containing a sub word with one or more bits is addressed, the read only memory automatically selects from the replacement memory a good subword cell group and causes the same to be substituted for the bad subword cell group.

U.S. Pat. No. 3,422,402 sets forth still another arrangement which involves, by means of indirect memory addressing, the use of large read only memory in which there is one bit word for each main memory word. This system includes a main memory, a first memory address register for selecting address location in the main memory, a second memory address register with substitute address locations connected to thy main memory, and a read only memory device adapted to be substituted for bad addresses in the main memory. A decoder is used for directing an address with defective bits into a substitute position of the read only memory and out to the second register in the substitute address locations for corrected interrogation of the main memory.

SUMMARY OF THE INVENTION

It is an object of the invention to provide an improved memory system arranged to use monolithic semiconductor arrays containing bad storage cells.

It is another object of the invention to provide a memory system which is capable of utilizing semiconductor storage arrays that contain all good storage cells and arrays that contain defective storage cells.

It is still another object of the invention to provide a memory system which uses memory modules containing semiconductor storage arrays having defective cells therein.

It is a further object of the invention to provide modules, for use in memory systems, in which semiconductor arrays containing defective bits can be utilized without changing the external configuration of the module.

It is also an object of the present invention to provide a memory module which can be utilized and interchanged with the present modules in the field and which contain defective bits.

It is yet another object of the present invention to increase the yield of the semiconductor storage array production process by using arrays containing defective cells therein.

The present invention in particular provides a memory storage module for use in a memory storage system, which provides to the next higher level of assembly in the storage system an identical outward mechanical and electrical appearance, regardless of whether or not the module contains totally good monolithic memory chips, e.g., no defective bits, or contains partially good monolithic memory chips, e.g., contains defective bits. This is accomplished by providing the chips with extra storage cells and that can be substituted for failing cells together with a special comparator circuit. The comparator circuit is provided with address input means, voltage input means and with externally contactable pads such that when the chip is mounted on a selected one of a series of pre-wired substrate, bad cell locations cannot be addressed.

These and other objects of the present invention will be more fully described in the following description of the preferred embodiments together with the accompanying drawings.

DESCRIPTION OF THE PREFERRED EMBODIMENTS

Figure 1:
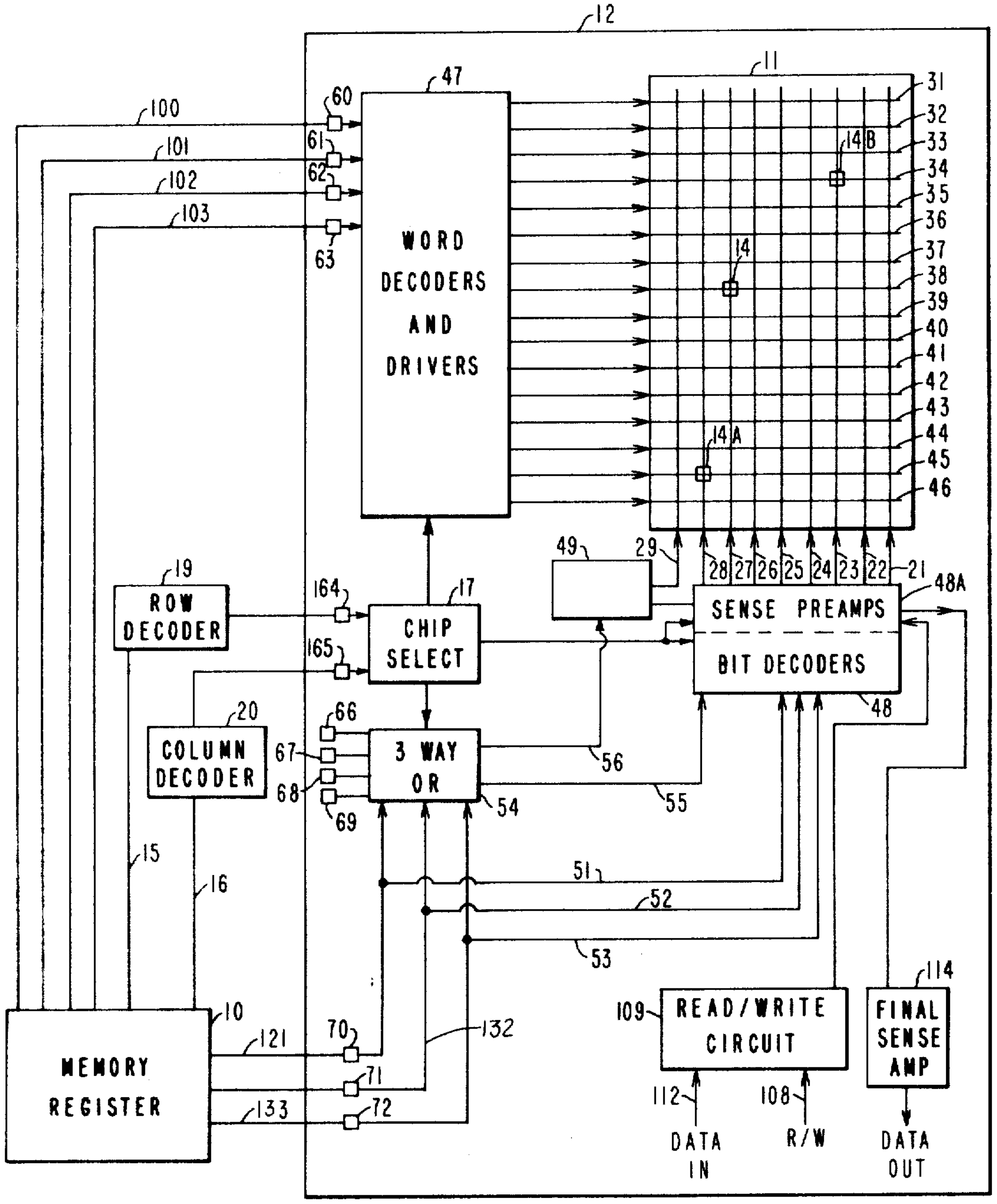
FIG. 1 is a schematic diagram of the monolithic memory employing the present invention.

A memory system incorporating the present invention is schematically shown in FIG. 1. The invention is practiced by adding to each semiconductor chip used in the system, an extra bit line, thereby providing extra storage positions in the chip, which can be used to replace any other bit line containing a defective storage position together with a comparator circuit for redirecting addresses initially directed to the bit line containing the defective storage position to the extra bit line, mounting the chip so formed on a selected pre-wired substrate, which will modify the comparator to either introduce the address of the defective bit line into the comparator circuit or disable the extra bit line, and placing the substrates in modules. Such memory systems in geneal comprise a plurality of storage cards (not shown) mounted on a memory board (not shown). The memory, so arranged, is best explained in conjunction with FIGS. 1, 2 and 3 and is addressed by means of an address stored in an address register 10, from which extend a sufficient number of address lines to serve the storage card.

In practice there are many such storage cards mounted on the memory board and each storage card usually comprises a plurality of modules. For clarity of illustration one such module 30 is shown in exploded view in FIG. 2 and contains for chips 12, mounted on two stacked pre-wired substrates 18 and 18a over which there is a cover 30.

Although in practice there are preferably many such storage chips in the memory, only one such chip 12 need be discussed at this time to describe the present invention. The address lines drive all chips, in all cards, in the following manner: selected address lines (as shown in FIG. 1) 15 are fed into a row decoder 19 on each storage card where the signals of the lines are decoded to select one row of chips upon the card. Each output line of the row decoder drives but one chip in each row of modules. Other address lines 16 extend to a column decoder 20 to select one column of chips on the card. Each output line of the column decoder 20 drives all chips within the respective column of modules. When there is a coincidence between the row address and the column address, determined by a chip select circuit 17 into which they are fed, then the chip 12 is selected and powered up for a read or write cycle.

Each chip 12, as shown in FIG. 1, in general, comprises a monolithic integrated semiconductor structure that has a plurality of functionally isolated individual cells electrically interconnected into an array 11 together will necessary support circuits. These cells provide a memory array with the electrical components of each memory cell composed of active and passive semiconductor devices. Such cells are shown, for example, in U.S. Pat. No. 3,423,737, issued Jan. 21, 1969 to L.R. Harper, and assigned to the same assignee as the present invention. A method of fabricating such a monolithic integrated semiconductor structure is described in aforementioned U.S. Pat. No. 3,508,209, issued to B. Agusta et al and assigned to the same assignee as the present invention.

Figure 2:
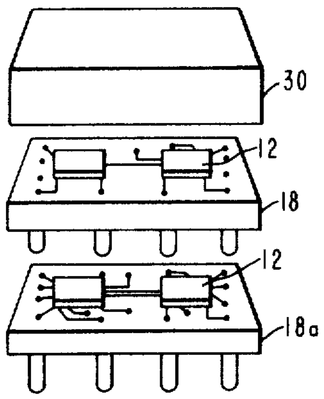
FIG. 2 is an exploded view of a module using the present invention.

Two such ships are mounted on a ceramic substrate; e.g., substrate 18, in FIG. 2, and two substrates 18 and 18*a* are packaged in a double-stacked memory array module. These double-stacked memory array modules are in turn, together with appropriate support circuits, plugged into a printed circuit card (not shown). A number of these cards are then packaged into a single unit called a memory board.

The support circuits on each memory chip provide decoding, driving and sensing functions, as well as voltage level control and output signal amplification, etc.

Additional support circuitry can be packaged in separate modules to link the main memory to the system central processing unit. These additional support circuits provide such functions as timing, pulse generation, address buffering, power gate buffering, sense amplification, voltage reference and the like.

As shown in FIG. 1, each chip of the present invention has 144 storage locations or storage cells 14, forming the array 11 which, in one direction, is collected into nine bits lines, 21 through 29, and in another direction, orthogonal to the first direction, collected into sixteen word lines, 31 through 46. The sixteen word lines are coupled into a series of word decoders and drivers 47, which has a set of externally addressable pads 60, 61, 62 and 63. The first eight bit lines 21 through 28 are coupled into a series of bit decoders 48 and sense pre-amplifiers 48A, while the ninth bit line 29, containing an extra or redundant group of cells, is coupled into a pre-amplifier 49. The bit decoders 48 and sense pre-amplifiers 48A are coupled to a set of externally addressable pads 70, 71 and 72 and to a comparator circuit 54 by leads 51, 52 and 53, This comparator circuit 54 is also connected to four externally addressable pads 66, 67, 68 and 69, to the bit decoders 48 and sense pre-amplifiers 48A by a lead 55, to the sense pre-amplifier 49 by a lead 56 and to a chip select circuit 17. The chip select circuit 17 is connected, to externally addressable pads 164 and 165, to bit decoders 48 and sense pre-amplifiers 48A and to the word decoders and drivers 47.

Normally, such chips are fabricated with even numbers of word lines and bit lines. Thus the 128 storage cells connected to the first eight bits lines 21 through 28 comprises a main group of cells while the other sixteen cells coupled to the ninth bit line 29 comprise a redundant or extra line. The cells forming this redundant line are, in accordance with the invention, available for substitution in place of a failing line in the main group of cells.

Following the fabrication of a chip with such a redundant bit line thereon, it is tested before it is mounted into the modules and used in the memory system. During the test sequence, such chips are sorted into ten different groups depending on whether or not they have defective cells therein and where the defective cells are located in the array.

Initially, the first eight bit lines 21 through 28 are tested. If all cells in these bit lines are good, the unit is usable after the redundant line 29 is disabled.

If any one of these first eight bit lines, 21 through 28, is defective in itself or contains a defective cell, the ninth bit line 29 is tested. If the ninth line is good, the cell is usuable but only after the address of the word line containing the defect is identified. The disabling of the redundant line, the identifying of the defect address and the substituting of the redundant line for a defective line is accomplished by mounting the chips on one of nine different substrates which are pre-wired to selectively ground certain of the pads 66, 67, 68 and 69 leading to the comparator circuit 54.

If more than one of the first eight bit lines contains a defective cell, the chip is unusable at this time, The groups into which the chips are sorted and which pads must be grounded by the substrates to correct for the defect is shown in Table 1.

TABLE I

| Group No. | Defective Bit Line | Substrate No. | Pads Grounded |
|---|---|---|---|
| 1 | None | 1 | 69 |
| 2 | 21 | 2 | |
| 3 | 22 | 3 | 68 |
| 4 | 23 | 4 | 67 |
| 5 | 24 | 5 | 67, 68 |
| 6 | 25 | 6 | 66 |
| 7 | 26 | 7 | 66, 68 |
| 8 | 27 | 8 | 66, 67 |
| 9 | 28 | 9 | 66, 67, 68 |
| 10 | unused | | |

If the particular chip to be used is one of the first group selected; e.g., contains all good cells in the first eight bit lines, it is mounted on a substrate 18 that has a printed connector thereon that will connect only pad 69 to a ground line on the substrate. The other pads 66, 67 and 68 are left unconnected to any lines on the substrate.

As will be later explained in conjunction with FIG. 3, this grounding of pad 69 disables the redundant bit line 29 and prevents the comparator circuit from substituting the redundant line 29 for an addressed line.

If a chip having pad 69 connected to ground is now activated into a high power state, the word decoders and drivers 47 are activated by signals coupled into pads 60, 61, 62 and 63, from the memory register 10, along lines 100, 101, 102 and 103. The bit decoders 48 and sense pre-amplifiers 48A are similarly activated by signals, from the memory register 10, introduced by leads 121, 122 and 123 into pads 70, 71 and 72. The signals sent to the word decoders 47, along lines 100, 101, 102 and 103, are decoded such that one and only one of the sixteen word lines 31 through 36 is selected and driven.

The signals on lines 131, 132, and 133 are introduced to leads 51, 52, and 53 via pads 70, 71 and 72 and are sent to the bit decoder 48 where they are decoded and sent to the sense pre-amplifiers 48A to activate and drive a selected one of the eight bit lines, 21 through 28. The coincidence of the applied power to the selected word line and the selected bit line selects one particular cell at the intersection of both lines.

The bit address leads 51, 52 and 53 are also connected to the comparator 54. Since, however, in this case array 11 contains no defective bit or line, pad 69 is connected to ground, the comparator 54 is not activated and the bit decoders 48 operate in their normal manner.

Data is stored in the selected storage cell by the coincidence of a write pulse on input 108 of a read-write circuit 109 together with a data input pulse on input 112. This coincidence conditions one of the eight bit lines, which has been decoded by the three address lines and the data is directed into the selected decoded storage cell by the selected bit line.

When only a read pulse is prsent on an input 108, the condition of the selected storage cell is read and the state of the cell detected by a sense pre-amplifier and fed to a final sense amplifier 114, which in turn sends data out to the storage card.

If the particular chip to be used contains one or more defective cells in one of the first eight word lines 21 through 28, it is mounted on a substrate that has a printed connector thereon that will selectively store the address of the defective line and introduce it into the comparator circuit via pads 66, 67 and 68. The pad 69 is left unconnected to any line on the substrate.

The printed connector on the substrate thus represents the address of the defective bit line and causes the comparator to respond to any address directed to that line. Thus the printed connector on the substrate serves as a constant output read only memory and stores the address of the defective line.

Following activation of the chip into a high power state, the word decoders and drivers 40 are again activated by signals on address lines 100, 101, 102 and 103 and the bit decoders 48A are activated by signals on address lines, 122 and 123. Thus once again, a single selected cell in the array 11 is addressed in exactly the same way that the cell in the totally good chip was addressd.

Again, the signals introduced into pads 70, 71 and 72, and directed to the bit decoders 48 and sense pre-amplifiers 48A, along lines 51, 52 and 53 are simultaneously sent to the comparator 54. Now, however, if the incoming address on leads 51, 52 and 53 compares with the address set into the comparator by the connection on the substrate grounding any of the pads 66, 67, and 68, the comparator disables the bit decoders 48 and activates through sense pre-amplifier 49 the redundant bit line 29. Data is now stored into or read out of the redundant bit line 29 exactly as if it were the originally addressed line.

If the incoming address on leads 51, 52 and 53 does not compare with the address set into the comparator by the proper connecting of the pads 66, 67 and 68 to a ground line on the substrate, the comparator 54 does not respond, the bit decoders 48B and sense pre-amplifiers 48A operates in their usual manner and the addressed line is activated.

In summary, the disclosed technique involves the addition to a semiconductor chip having a memory array thereon, of an extra bit (or word) line and a comparator circuit having $n+1$ externally addressable inputs and the mounting of the chip on a pre-wired substrate so that the address, of ($n$) binary bits, of any defective sector is permanently established in the array by selectively grounding certain of the externally addressable inputs to the comparator circuit.

The normal input address sent to the chip is compared in the comparator to the defective address established in the comparator by the substrate wiring. If they match, the bit decoders are disabled and the extra line on the chip addressed. If the compared addresses do not match, the input address signals are decoded in the normal manner and the originally addressed line is selected. Thus address signals to good lines are unaffected but an address signal directed to a defective line will be switched to the extra line.

Figure 3:
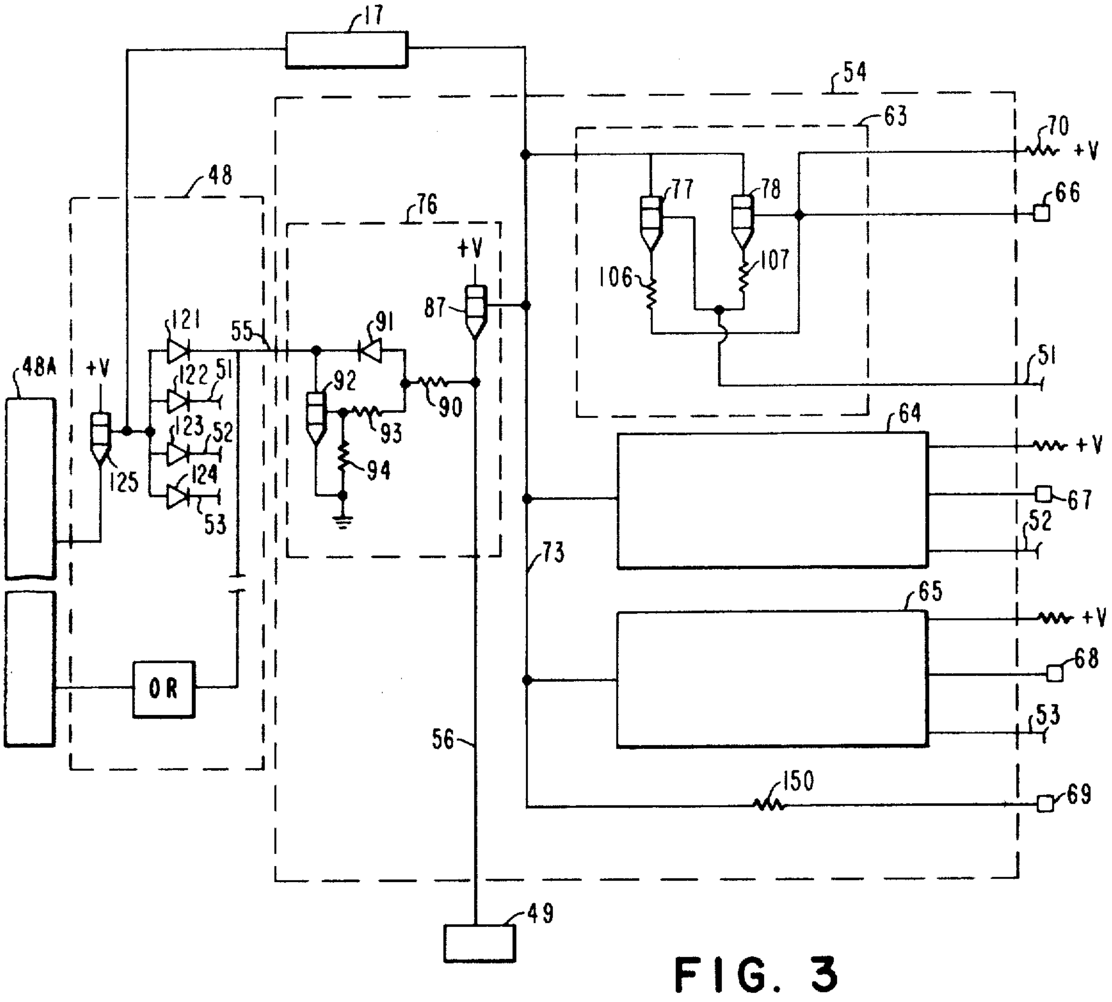
FIG. 3 is a logic diagram of the present invention.

FIG. 3 shows the logic function of the invention as it is performed with bipolar technology.

The comparator circuit 54 of FIG. 1 is, as shown in detail in FIG. 3, comprised of three exclusive OR circuits 63, 64 and 65 coupled to an inhibit pulse circuit 76.

Each exclusive OR circuit, of the comparator 54, comprises a pair of cross-coupled transistors. The collector of each transistor is connected, through a common output line 73 and the pulse inhibit portion circuit 76, to the bit decoders 48 and sense pre-amplifiers 48A of the first eight bit lines and the sense pre-amplifier 49 of the redundant bit line. The emitter of one transistor is coupled to the base of the second transistor and to the input lines 51, 52 and 53. The emitter of the second transistor is cross-coupled to the base of the first transistor and to a voltage source +V and to pads 66, 67 and 68.

FOr convenience only, only one such exclusive OR circuit need be described. For example, the two transistors 77 and 78 forming exclusive OR 63 have their collectors coupled, via output lead 73, to the pad 69, through a current limiting resistor 150, and to the circuit 76. The base of transistor 77 is connected through a current limiting resistor 107 to the emitter of transistor 78 and to the input line 51. The base of transistor 78 is connected through a current limiting resistor 106 to the emitter of transistor 77 to the pad 66, and through resistor 70 to the voltage source +V. When pad 66 is not connected to the ground line on the substrate upon which it is mounted, the base of transistor 78 and the emitter of transistor 77 has a positive voltage thereon, from the voltage source +V, which is the equivalent of a binary address of 1.

The inhibit pulse circuit 76 essentially comprises a pair of transistors 87 and 92. The collector of transistor 87 is connected to +V while the base is connected to the line 73. The emitter of transistor 87 is connected to line 56 and through resistor 90 and diode 91 to the collector of transistor 92 and to line 55. The base of transistor 92 is connected through resistor 93 to resistor 90 and through resistor 94 to ground and to the emitter of transistor 92. The bit decoders 48 are a series of OR circuits. Each OR circuit consists of a diode 121 whose anode is connected to the line 55 and diodes 122, 123 and 124 whose anodes are respectively connected to input address lines 51, 52 and 53. The cathodes of all the diodes 121, 122, 123 and 124 are connected to the chip select circuit 17 and the base of a transistor 125 whose is connected to the sense pre-amplifier 48A.

The following two situations will fully describe the operation of these illustrative circuits.

If it is assumed that the bit lines addresses are as set out below:

| Bit Line | Address |
|---|---|
| 21 | 111 |
| 22 | 110 |
| 23 | 101 |
| 24 | 100 |
| 25 | 011 |
| 26 | 010 |
| 27 | 001 |
| 28 | 000 |

and it is further assumed bit line 25 whose address is 011 is defective, then this address is established on the chip by mounting the chip on a substrate, having printed circuit wiring thereon, such that the pad 66 is permanently and directly connected to a ground line.

This grounding of pad 66 causes the base of transistor 78 and the emitter of transistor 77 to be brought to ground potential which is the equivalent to a binary "O" address. Since the pads 67 and 68 are unconnected, the equivalent bit address set in the exclusive OR circuits 64 and 65 by voltage source +V, are 1s.

The memory system operates as follows:

After the word decoders and drivers 47 are activated by signals introduced into pads 60, 61, 62 and 63 on word address lines 100 101, 102, and 103 of FIG. 1 and the bit decoders 48 are simultaneously activated by signals on address lines 51, 52 and 53, received from the memory register 10 via pads 70, 71 and 72, the chip is activated into a high power state by chip select circuit 17. The signals on the word address lines are decoded by the word decoders such that one and only one of the sixteen word lines is selected and driven.

The signals on the bit addresses lines 51, 52 and 53 are decoded and used to activate and drive a selected one of the bit lines 21 to 28. The coincidence of the applied power to the selected word line and the selected bit line selects one particular cell at the intersection of both lines.

Thus when the address 011 is applied, via leads 51, 52 and 53, to the input leads of each exclusive OR circuit 63, 64 and 65, these exclusive OR circuits turn off because the voltages, now applied to the base of any one transistor, by the address input is identical to the voltage established on the base of its cross-coupled transistor. For example, in the case of trnasistor 77, the binary address on line 51 was 0 and since pad 66 was grounded, in the given example, the binary address on the base of transistor 78 is also a 0. Turning off of these exclusive OR circuits causes lead 73 to rise towards the voltage supplied by the chip select circuit 17. As the voltage on lead 73 rises, transistor 87 turn on. When transistor 87 turns on, the bit decoder 48 becomes disabled because a part of the voltage +V applied to the collector of transistor 87 becomes applied to the base of transistor 92 through resistors 90 and 93. Because of the voltage drop through resistor 93, transistor 92 turns on and its collector becomes fixed below a predetermined threshold level by voltage divider 94, 93, 90 and diode 91 to disable the bit decoder 48 by pulling, through diode 121, the base of transistor 125 below its turn on voltage. The same voltage at the emitter of transistor 87 is used to activate via lead 56, the redundant line sense amplifier 49. When the bit decoders 48 thus become disabled all the bit lines 21 through 28 become insensitive to the inputs from the memory address register.

In the case where no line in the first eight word lines is defective, the pad 69 is grounded by mounting the chip on a substrate having printed wiring thereon that will permanently connect pad 69 to a ground line. In this case, the base of transistor 87 is coupled to ground through resistor 150 and by pad 69. When the base is so connected to ground transistor 87 is turned off, redundant sense pre-amplifier 49 remains unbiased and inactive and the decoder 48 remains responsive to any signals applied thereto, via leads 51, 52 and 53.

Data is stored in the selected storage cell by the coincidence of a write pulse on input 108 of a read-write circuit 109 together with a data input pulse on input 112. This coincidence conditions the sense pre-amplifier, which has been decoded by the three address lines and the data is directed into the selected decoded storage cell by the selected bit line.

When only a read pulse is present at input 108, the condition of the selected storage cell is read and the state of the cell detected by the sense pre-amplifier and fed to a final sense amplifier 114, which in turn sends data out to the storage cards.

For the case when bit line 21 is defective, none of the pads 66, 67, 68 or 69 are grounded by the substrate. Pads 69 is not grounded because it is necessary to use the extra line 29 and the other pads 66, 67 or 68 are not grounded in order to establish the address of line 21; e.g., 111, in the comparator.

Conversely, when bit line 28 is defective, each of the pads 66, 67 and 68 are grounded to establish the address of line 28; e.g., 000, in the comparator.

The present invention can also be used to increase the number of usable chips in a system that uses but three quarters of the array, by employing the redundant line, of the invention, to replace defective cells, in a different quadrant, so that the chip has addressable defects in but one quarter.

This may become clearer from the following example taken in conjunction with chip 12 of FIG. 1. If it is assumed that word lines 31, 32, 33, and 34 are the first quadrant, lines 35, 36, 37 and 38 are the second quadrant, lines 39, 40, 41 and 42 are the third quadrant and lines 43, 44, 45 and 46 are the fourth quadrant and that the array contains two widely separated defective cells 14A and 14B. Cell 14A is at the intersection of bit line 28 an word line 45 and cell 14B is at the intersection of bit line 23 and word line 34.

Accordingly, if the invention were to be employed it would be ineffective since only one of these cells could be substituted for by using the redundant line 29. Thus if the present invention only were to be used, the entire chip 12 would have to be discarded since the second defective cell 14B, which remains unconnected would render the cell unusable. It has been known that chips with defective cells in a single quadrant can be organized as though they have all good cells in one direction, but only three quarters of good cells in the other direction. This is accomplished by hard wiring techniques by making a quadrant of the chip unaddressable.

If this known technique were to be used alone in the above example, the chip would still be unusable because the defects 14A and 14B are in different quadrants.

However, by combining the concepts of the present invention with the concept of organizing the defective chips in the above described three quarter arrangement, the chip can be made usable. Thus, for example, the present invention could be used to substitute for defective cell 14A and the known three quarter good arrangement of the prior art could be used to eliminate the effect of defective cell 14B.

While the invention has been particularly shown and described with reference to the preferred embodiment thereof, it will be understood by those skilled in the art that various changes in form and details of the device and the method of making it may be made therein without departing from the spirit and scope of the invention.

What is claimed is:

1. Memory storage system comprising a main memory means for storing data in storage cells, wherein at least one of said storage cells is defective, a substrate, a semiconductor chip, containing thereon said main memory means, a decoder circuit coupled to said main memory means, alternate data storage means, and a comparator circuit, mounted on said substrate, and memory address register means for applying addressing signals to said comparator circuit and to said decoder circuit, said addressing signals containing predetermined signals indicative of the location of said defective cell.

said substrate including conductive means for setting said comparator circuit so that said comparator circuit applies a pulse to the decoder circuit and the alternate data storage means only when said predetermined signals of said addressing signals, indicative of the location of said defective cell, are applied to said comparator, said decoder circuit having inhibit means responsive to said pulse to prevent said decoder circuit from applying an output pulse to said main memory means when said predetermined signals are applied to said comparator.

2. The memory system of claim 1 wherein said comparator circuit comprises a series of exclusive OR circuits, each exclusive OR circuit having an externally addressable pad.

3. The memory system of claim 2, wherein said exclusive OR circuits further have a common output and said common output has an externally addressable pad thereon, and said conductive means for setting is a ground line on said substrate.

4. The memory system of claim 2 wherein said conductive means for setting is a ground line on said substrate and is connected to the externally addressable pad of at least one of said exclusive OR circuits.

* * * * *